No. 779,966. PATENTED JAN. 10, 1905.
R. RILEY.
FILLING FORK FOR LOOMS.
APPLICATION FILED JULY 23, 1904.

Witnesses,
Edward H. Allen
S. Wm. Lutton

Inventor:
Richard Riley,
by Crosby Gregory.
Atty's.

No. 779,966. Patented January 10, 1905.

UNITED STATES PATENT OFFICE.

RICHARD RILEY, OF FALL RIVER, MASSACHUSETTS, ASSIGNOR TO DRAPER COMPANY, OF HOPEDALE, MASSACHUSETTS, A CORPORATION OF MAINE.

FILLING-FORK FOR LOOMS.

SPECIFICATION forming part of Letters Patent No. 779,966, dated January 10, 1905.

Application filed July 23, 1904. Serial No. 217,834.

*To all whom it may concern:*

Be it known that I, RICHARD RILEY, a citizen of the United States, and a resident of Fall River, county of Bristol, State of Massachusetts, have invented an Improvement in Filling-Forks for Looms, of which the following description, in connection with the accompanying drawings, is a specification, like characters on the drawings representing like parts.

This invention has for its object the production of a novel filling-fork for looms so constructed and arranged that the ends of the tines are greatly strengthened and braced against any tendency to bend.

If the tines of a filling-fork become bent out of place, serious difficulty arises, for the bent tine or tines may engage the grid and cause the fork to be tilted, even if the filling is absent, and a thin place is made in the cloth. On the other hand, the bend may be such that when the filling is present it cannot act to tilt the fork, and then the normal operation of the loom is changed, as by stoppage or a change of filling in an automatic loom when such change is wholly uncalled for.

In the present embodiment of my invention I have united the lower ends of the fork-tines in such a manner that they are braced and strengthened with greatly-decreased liability to bend and more weight is added near the free ends of the tines without interfering with the normal operation of the fork. On certain weaving, especially with the coarser numbers of yarn, this additional weight at or near the ends of the tines is desirable.

The novel features of my invention will be fully described in the subjoined specification, and particularly pointed out in the following claim.

Figure 1:
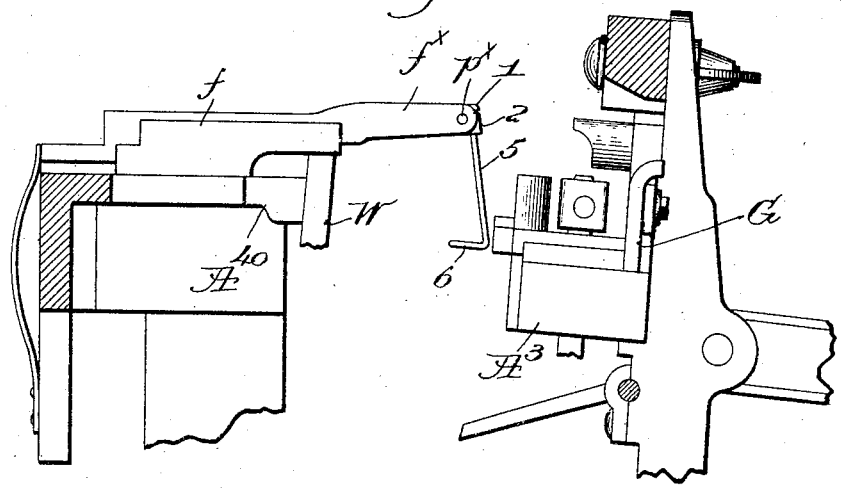
Figure 2:
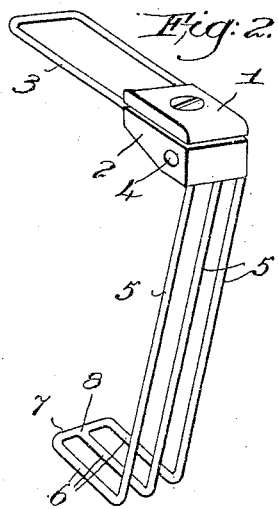

Figure 1 is a cross-sectional view of a portion of a loom, showing the grid on the lay, the fork-slide, and a filling-fork carried thereby embodying one form of my invention; and Fig. 2 is an enlarged perspective view of my novel filling-fork detached Referring to Fig. 1, the lay $A^3$, having a grid G thereon, the breast-beam $A^{40}$, having a stand or guide $f$ rigidly secured thereon, the fork-slide $f^\times$ mounted thereon, and the weft-hammer W may be and are all of usual or well-known construction and operate in a manner familiar to those skilled in the art.

The filling-fork embodying my present invention is clearly shown in Fig. 2 and, as herein illustrated, comprises a two-part body 1 2, having a rigidly-attached loop or tail 3 to coöperate with the usual hook of the weft-hammer W, the member 2 of the body having a transverse hole 4 for the pivot or fulcrum pin $p^\times$, Fig. 1. The upper ends of the tines 5 are rigidly secured in any suitable manner to the body, said tines depending therefrom, and at their lower ends they are bent backward or toward the front of the loom when the filling-fork is in place, as at 6. The extremities of the bent portions 6 are rigidly united or connected by a lateral connection 7, and herein this is shown as an integral part of the two outermost tines, the end of the central tine being united thereto at 8 by brazing, soldering, or in any other suitable manner.

When the lay beats up, the bent lower portions 6 sweep across the lay in the usual transverse recess formed in its raceway and the fork coöperates in usual manner with and is tilted by the filling. If the filling is absent, the tines can pass between the bars of the grid G, Fig. 1, as is customary, the bent portions 6 being of sufficient length to prevent any engagement of the connection 7 with the grid. This connection 7 acts as a lateral brace to stiffen and strengthen the lower ends of the tines, preserving them in parallelism and obviating any tendency thereof to become bent out of their proper positions.

I prefer to slightly upturn the bent portions 6 of the tines, as shown best in Fig. 1, so that they will sweep easily across the bottom of the recess in the raceway of the lay.

Having fully described my invention, what

I claim as new, and desire to secure by Letters Patent, is—

As a new article of manufacture, a filling-fork for looms comprising a body, tines depending therefrom and bent backward at their lower ends, and a fixed lateral connection formed with and between the extremities of the bent portions.

In testimony whereof I have signed my name to this specification in the presence of two subscribing witnesses.

RICHARD RILEY.

Witnesses:
BENJAMIN COOK, Jr.,
G. M. MARZ.